United States Patent
Wilson et al.

(10) Patent No.: US 11,192,311 B2
(45) Date of Patent: Dec. 7, 2021

(54) METHOD OF MANUFACTURING A SPOKE FOR A NON-PNEUMATIC TIRE

(71) Applicant: Compagnie Generale des Etablissements Michelin, Clermont-Ferrand (FR)

(72) Inventors: Brian D Wilson, Greer, SC (US); Eric Rivers, Greenville, SC (US); Robert Gaut, Powdersville, SC (US); David C Lung, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 58 days.

(21) Appl. No.: 16/954,282

(22) PCT Filed: Dec. 20, 2018

(86) PCT No.: PCT/US2018/066856
§ 371 (c)(1),
(2) Date: Jun. 16, 2020

(87) PCT Pub. No.: WO2019/133441
PCT Pub. Date: Jul. 4, 2019

(65) Prior Publication Data
US 2021/0114312 A1    Apr. 22, 2021

(51) Int. Cl.
*B29C 65/00* (2006.01)
*B60C 7/00* (2006.01)
(Continued)

(52) U.S. Cl.
CPC .............. *B29C 65/70* (2013.01); *B29C 53/04* (2013.01); *B29C 66/7212* (2013.01); *B60C 7/18* (2013.01);
(Continued)

(58) Field of Classification Search
CPC .......... B29C 53/04; B29C 65/00; B29C 65/70; B29C 66/00; B29C 66/70; B29C 66/72;
(Continued)

(56) References Cited

U.S. PATENT DOCUMENTS

2010/0140969 A1* 6/2010 Lin ...................... B25J 15/0052
294/86.4
2010/0301662 A1* 12/2010 Schlanger ............. B60B 21/064
301/58

(Continued)

FOREIGN PATENT DOCUMENTS

| EP | 2111936 A2 | 10/2009 |
|----|------------|---------|
| FR | 334354 A | 12/1903 |
| FR | 1164324 A | 10/1958 |

OTHER PUBLICATIONS

European Patent Office; International Search Report and Written Opinion for patent application PCT/US2017/068663 filed Dec. 28, 2017; Publisher: European Patent Office, Rijswijk, Netherlands; Aug. 22, 2018; pp. 1-10, enclosed.

(Continued)

*Primary Examiner* — Jacob T Minskey
*Assistant Examiner* — Matthew Hoover
(74) *Attorney, Agent, or Firm* — Neal P. Pierotti

(57) ABSTRACT

A method of manufacturing a spoke (12) for a non-pneumatic tire is provided that involves providing a first form (14) and a second form (16), where first and second components (18, 20) of the spoke are placed on the first form (14). A third component (22) of the spoke is placed on the second form (16). The first and second components are transferred to the second form (16). The first component, the second component, and the third component are transferred from the second form to a mold (48). Further, the first (Continued)

component, the second component, and the third component have heat and pressure applied thereto for curing.

15 Claims, 9 Drawing Sheets

(51) Int. Cl.
    *B29C 65/70*      (2006.01)
    *B29C 53/04*      (2006.01)
    *B60C 7/18*      (2006.01)
    *B29L 30/00*      (2006.01)
    *B60C 7/14*      (2006.01)

(52) U.S. Cl.
    CPC ......... *B29L 2030/006* (2013.01); *B60C 7/146* (2021.08)

(58) Field of Classification Search
    CPC ..... B29C 66/721; B29C 66/7212; B06C 7/00; B06C 7/10; B06C 7/18
    See application file for complete search history.

(56) References Cited

U.S. PATENT DOCUMENTS

2012/0280527 A1* 11/2012 Lin .......................... B25J 9/04
                                                                294/213
2019/0001768 A1    1/2019 Stone

OTHER PUBLICATIONS

European Patent Office; International Search Report and Written Opinion for patent application PCT/US2017/066856 filed Dec. 20, 2018; Publisher: European Patent Office, Rijswijk, Netherlands; Mar. 19, 2019; pp. 1-10, enclosed.

* cited by examiner

METHOD OF MANUFACTURING A SPOKE FOR A NON-PNEUMATIC TIRE

The present application is a 35 U.S.C. § 371 application of PCT/US2018/066856 filed on Dec. 20, 2018 and entitled "Method of Manufacturing a Spoke for a Non-Pneumatic Tire." PCT/US2018/066856 claims the benefit of PCT/US17/68663 filed on Dec. 28, 2017 and entitled "Method of Manufacturing a Spoke for a Non-Pneumatic Tire." The entire contents of PCT/US17/68663 and PCT/US2018/066856 are incorporated by reference herein in their entireties for all purposes.

FIELD OF THE INVENTION

The subject matter of the present invention relates to a method of manufacturing a spoke used in the construction of a non-pneumatic tire. More particularly, the present application involves arranging components of a spoke on a first form and then transporting them to a second form for assembly with at least one other component of the spoke.

BACKGROUND OF THE INVENTION

Non-pneumatic tires are those that do not require air or other fluid for their inflation for use. Some non-pneumatic tires have a plurality of spokes arranged circumferentially around and attached to a hub. On their opposite end, the spokes are attached to a shear band. To build the spoke component of the non-pneumatic tire, it is known to combine together the spoke component products into a long form that is cut to the desired length. This cutting can be before or after curing of the product. Another known method of producing spokes involves placing the components of the spoke into a mold in which they are not assembled into a green spoke beforehand. Although capable of forming spokes for non-pneumatic tires that include a single component, or two components, current methods of manufacturing spokes for non-pneumatic tires that have three or more components are either not in existence, are not economically feasible, and are not robust. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
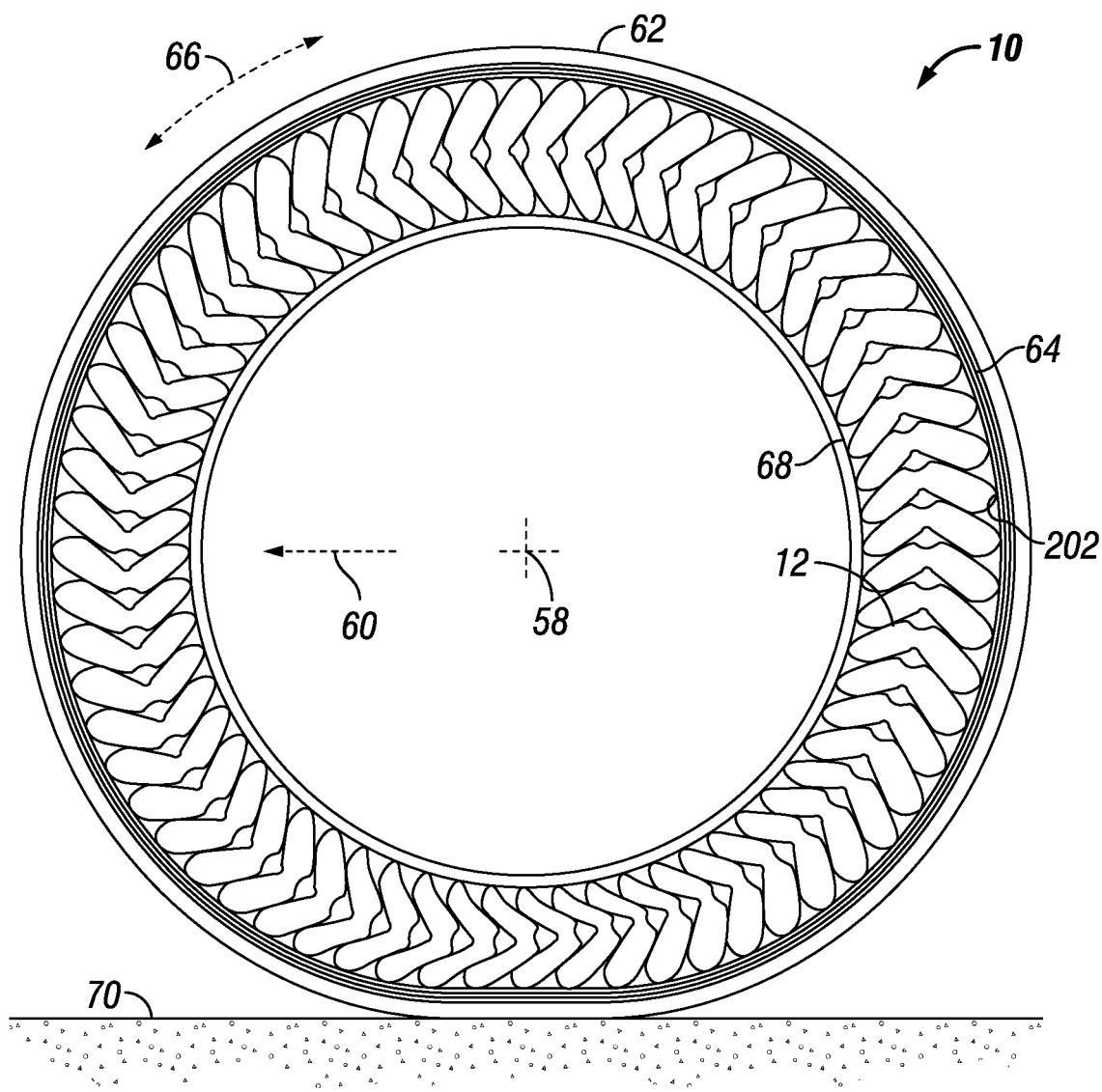
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a method of constructing a spoke 12 for use in a non-pneumatic tire 10. The spoke 12 is constructed of a number of components 18, 20, 22, 24, 26 and 28 using a pair of forms 14, 16. The third component 22 is placed on the second form 16, and the remaining components 18, 20, 24, 26 and 28 are placed on the first form 14. A pick and place device 42 grasps the components 18, 20, 24, 26 and 28 from the first form 14, folds them, and places them onto the second form 16 that holds the third component 22. The green spoke 12 is then transported to a storage area and held until ready for curing at which time the green spoke 12 is loaded onto a second half 48 of a mold 30 and a press 50 then presses the first half 46 of the mold 30 thereon and locks the mold halves 48, 50 with the included green spoke 12 together. The locked mold 30 is then transferred to an oven area 54 and heated with the mold 30 locked so that heat and pressure are applied to cure the spoke 12. The mold 30 is opened and the second half 48 with the cured spoke 12 is moved to a demold press station 56, while the first half 46 is cycled back to a subsequent second half 48/green spoke 12 for subsequent use. The cured spoke 12 is demolded and sent downstream to an inspection station and adhesion preparation station. Alternatively, the first half 46 and second half 48 are not separated from one another in that they are matched to one another and remain with one another upon the subsequent curing of spokes 12 over and over. In this regard, the first half 46 waits until the second half 48 has the spoke 12 demolded and then the first half 46 is again paired up with its second half 48 when a subsequent spoke 12 is cured.

FIG. 1 shows a non-pneumatic tire 10 that has an axis 58 at its center, and a radial direction 60 extends from the axis 58. Tread 62 is located on the outer exterior of a shear band 64 and extends all the way around the non-pneumatic tire 10 in the circumferential direction 66. The shear band 64 is located inward in the radial direction 60 from the tread 62 and likewise extends 360 degrees around the axis 58 in the circumferential direction 66. A series of spokes 12 engage the shear band 64 and extend inward in the radial direction 60 from the shear band 64 to a hub 68 of the non-pneumatic tire 10. Any number of spokes 12 can be present, and their cross-sectional shape can be different from that shown. In some instances, between 64-80 spokes 12 are present in the non-pneumatic tire 10. The hub 68 is located inward from the spokes 12 in the radial direction 60 and can be mounted onto a wheel of the vehicle. The spokes 12 at the top of the non-pneumatic tire 10 are in tension, and the spokes 12 at the bottom are in compression as the non-pneumatic tire 10 rests on the ground 70 and as the non-pneumatic tire 10 turns in normal operation of the vehicle.

Figure 2:
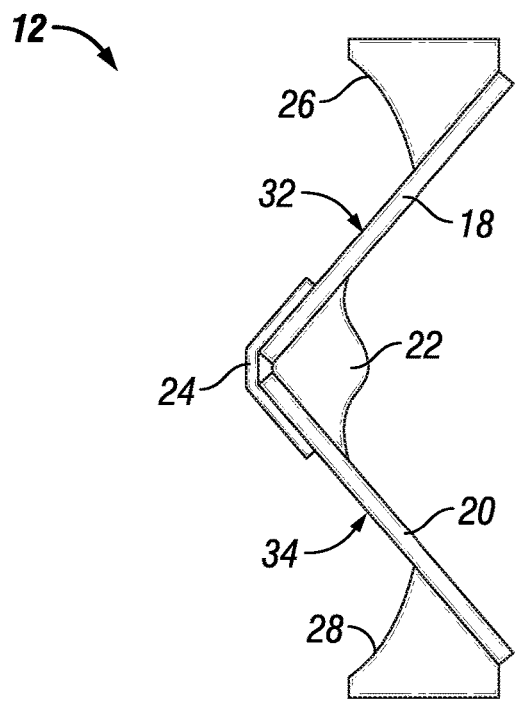
FIG. 2 is a side view of a spoke of a non-pneumatic tire made up of six components.

FIG. 2 is a side view of an exemplary embodiment of the spoke 12 that could be produced in accordance with the disclosed method. Other versions of the spoke 12 that could be made according to the present disclosure may be found in International Application Number PCT/US2016/069440 filed Dec. 30, 2016 entitled, "Resilient Composite Structural Support", the entire contents of which are incorporated by reference herein in their entirety for all purposes. The components of the spoke 12 may be comprised of rubber of the general type used in the construction of conventional rubber pneumatic radial tires, polyester cord materials, and fiberglass reinforced resin. The first component 18 makes up an inner leg of the spoke 12, and the second component 20 forms an outer leg of the spoke 12. The components 18, 20 may also be referred to as panels since they have an elongated rectangular cross-sectional shape. The first and second components 18, 20 can be panels made of fiber reinforced plastic reinforcements surrounded by rubber to form a membrane. The components 18, 20 may have a flexural rigidity of approximately 140,000 N-mm$^2$. The first and second components 18, 20 may have a larger stiffness than other components of the spoke 12.

The third component 22 is located at a nose portion of the spoke 12 and can be made of rubber that has a modulus of 4.8 MPa in some embodiments. The material making up the third component 22 can be extruded into generally the cross-sectional shape illustrated. The third component 22 engages both the first and second components 18, 22 on one side of both the first and second components 18, 22. In some instances, some portion of the third component 22 can flow through the gap at the nose portion so as to engage the opposite sides of the first and second components 18, 22 so that both the front and back sides of the first and second components 18, 22 are engaged by the third component 22.

A fourth component 24 is at the nose portion of the spoke 12 and is on sides of the first and second components 18, 22 opposite from that of the third component 22. The fourth component 24 can be a tissue that has a membrane structure composed of polyester fibers made from an 1100 by 2 cord with a pace of approximately 1 mm and a tensile modulus of approximately 3,750 MPa. The reinforcement fibers may be similar to those found in radial cords of pneumatic tires. The rubber surrounding the reinforcement fibers can have a modulus of approximately 5 Mpa. Fifth and sixth components 26, 28 can also be located on the same sides of the first and second components 18, 20 as the fourth component 24. The fifth component 26 is an inner foot of the spoke 12 and may engage the hub 68 thus being located radially inward on the spoke 12. The sixth component 28 is an outer foot of the spoke 12 and engages the shear bad 64 when the spoke 12 is incorporated into the tire 10. The sixth component 28 is located outward in the radial direction 60 relative to other portions of the spoke 12. The fifth and sixth components 26, 28 may be rubber that is extruded into a shape with a cross-section generally that of the final form of the spoke 12.

Figure 3:
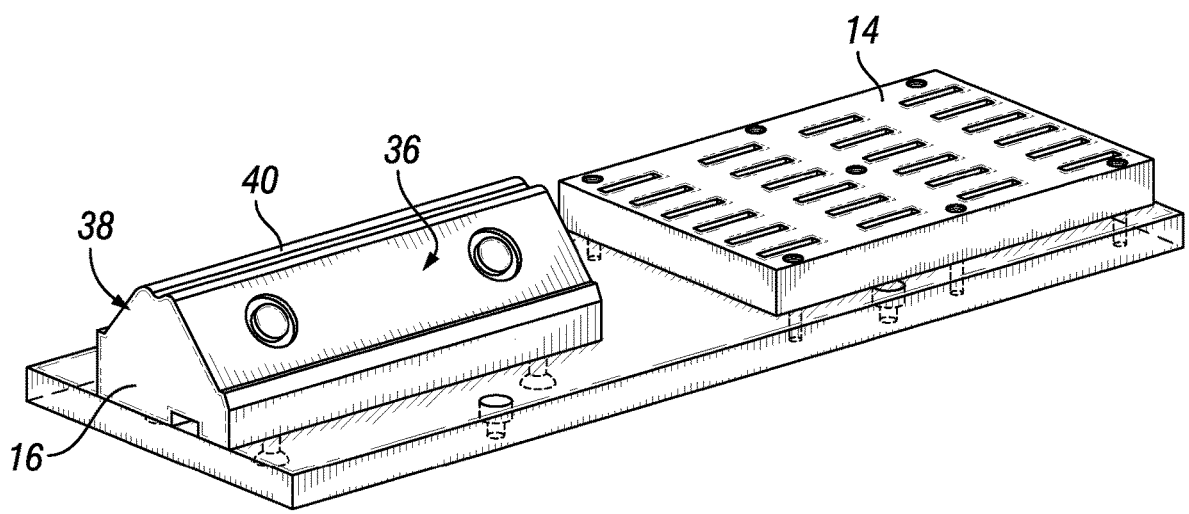
FIG. 3 is a perspective view of a first form and a second form.

FIG. 3 illustrates a first form 14 and a second form 16 that can be used in the process of building the spoke 12. The first form 14 is a flat form with a flat upper surface. Ports to the flat upper surface can apply vacuum thereon to draw or hold objects against the flat upper surface. The second form 16 is an angled form and not a flat form. In this regard, the second form 16 has a first surface 36 and a second surface 38 that are arranged to one another at a non-zero angle. The angle between the first and second surfaces 36, 38 can be from 60 degrees-90 degrees, from 90 degrees-120 degrees, or up to 150 degrees. The surfaces 36, 38 do not lie in the same plane as one another and do not lie in planes that are parallel to one another. An indented apex 40 is present between the two surfaces 36, 38 and is configured so that the two surfaces 36, 38 are separated from one another and do not engage one another, and so that a point or convex surface is not present at the apex at the top of the second form 16.

Figure 4:
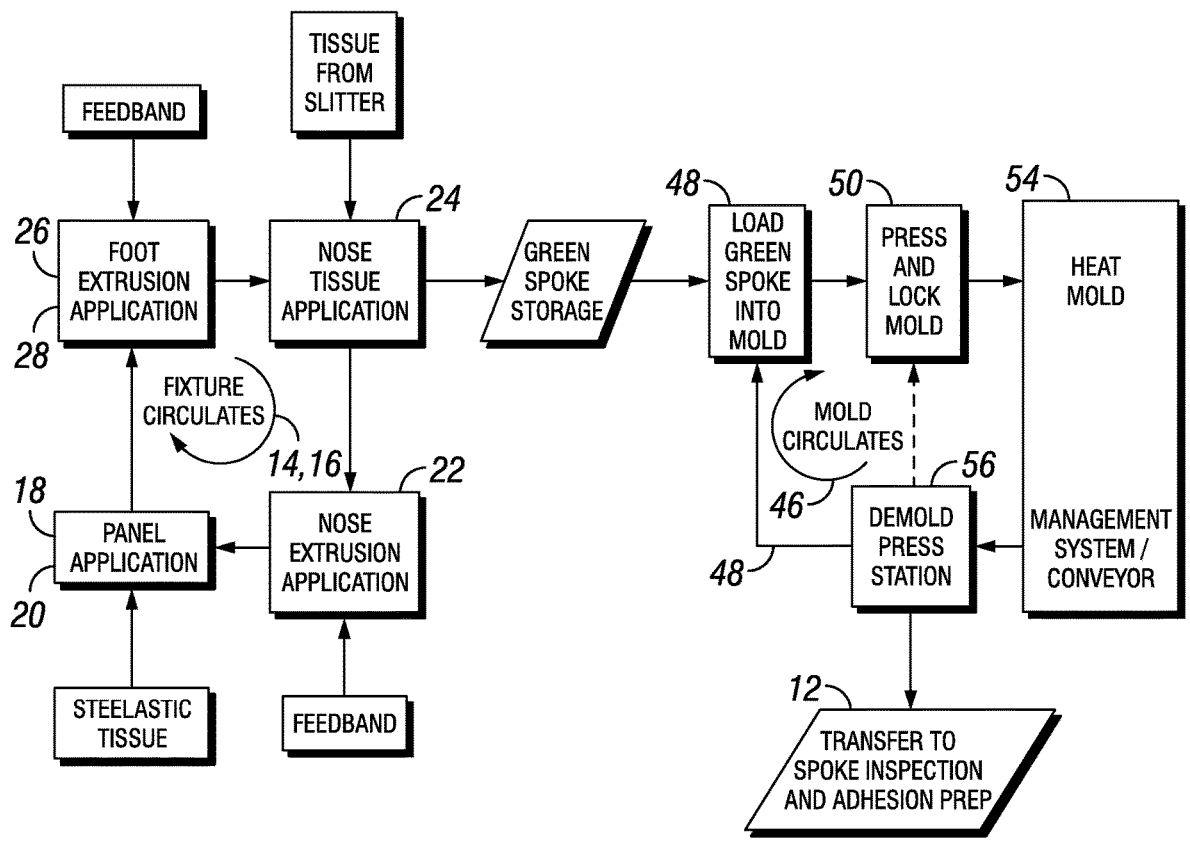
FIG. 4 is a schematic diagram of the process of manufacturing a spoke for a non-pneumatic tire that includes a green spoke building process and a curing process.

FIG. 4 is a schematic diagram of various stations that execute the build process of the spoke 12. On the bottom left hand of the figure, reinforced tissue that can compose the first and second components 18, 20 may be fed to a panel application station designed by reference numbers 18, 20 in which these components are cut to length and laid onto the flat upper surface of the first form 14. This placement can be by any machine or mechanism, and with reference to FIG. 5, a top view of the first form 14 with the applied first and second components 18, 20 is shown. The first component 18 has an upper surface 32 that faces away from and does not contact the upper surface of the first form 14. Likewise, the second component 20 has an upper surface 34 that faces in the same direction as the upper surface 32 and does not engage the upper surface of the first form 14.

As used herein, various components are provided with reference numbers that address both the component and also the station which can process the component. For instance, in FIG. 4 the panel application station is identified by reference numbers 18 and 20 which are also used to identify the first and second components 18 and 20 that are processed at the panel application station. By associating the numbers of the components with those of the station that processes them, it may be better understood by the reader which stations are processing which components. However, it is to be understood that other stations may also process the same components even if they do not share the same reference number.

After application of the first and second components 18, 20 to the first form 14, the first form 14 can be moved to a foot extrusion application station 26, 28 as designated in FIG. 4. Here, a conveyor may supply extruded rubber or other material to the foot extrusion application station 26, 28 which cuts to length and applies the fifth component 26 and the sixth component 28 which are feet of the spoke 12. The fifth and sixth components 26, 28 are transferred to the first form 14 by any process or mechanism. In this regard, the fifth component 26 is placed onto and engages the upper surface 32 of the first component 18. The sixth component 28 is placed onto and engages the upper surface 34 of the second component 20 by any machine or process. The various components of the green spoke 12 can be held together by the tackiness or inherent adhesive qualities of the uncured rubber or other material making up the components of the spoke 12.

Figure 5:
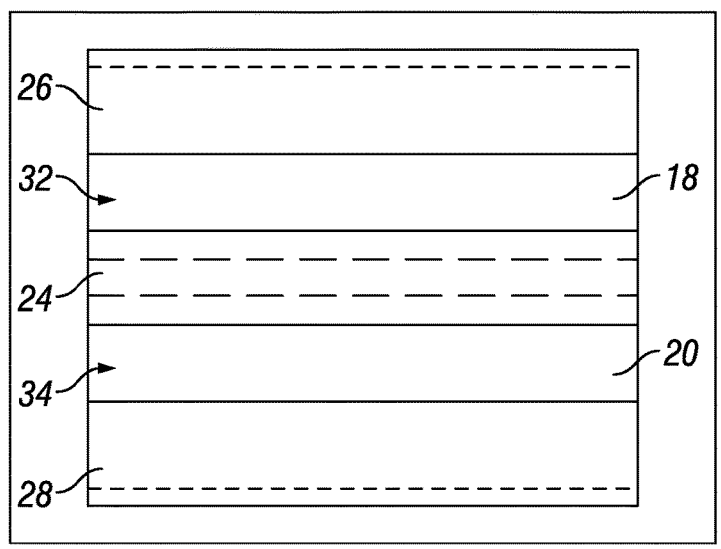
FIG. 5 is a top view of a first form with some of the components of the spoke located thereon.

At this point, the first form 14 is circulated to another application station as illustrated with reference back to FIG. 4. A conveyor may supply the tissue to the nose tissue application station from which the fourth component 24 of the spoke 12 is applied to the form 14. The fourth component 24 is picked up or otherwise placed onto both of the upper surfaces 32, 34 so that it engages both the first and second components 18, 20. If a space is present between the first and second components 18, 20 the fourth component 24 spans this empty space. FIG. 5 shows the positioning of the fourth component 24 onto the first form 14. The components 24, 26, 28 can be located on only one side of the components 18, 20 and do not engage their opposite sides and likewise do not engage the upper surface of the first form 14. Other arrangements are possible where in fact the components 24, 26, 28 do in fact engage the first form 14.

The various stations in FIG. 4 that function to build the green spoke 12 can be supplied the components from conveyors, be cut to the appropriate length, or supplied such that the material is cut to length when at the station to be used in the spoke 12. Each station shown and described may be provided with its own automated pick and place device that receives the cut product and precisely places it onto the form 14, 16 in question.

Figure 6:
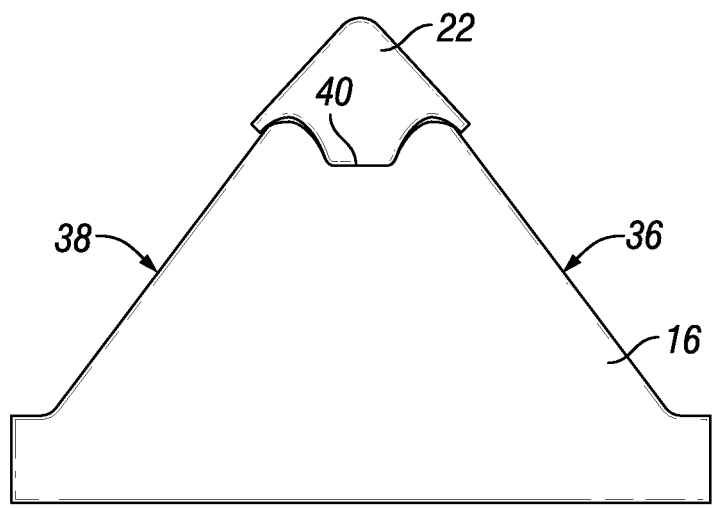
FIG. 6 is a side view of a second form with a component of the spoke located thereon.

Referring back to FIG. 4, a conveyor may supply rubber to the nose extrusion application station 22 which forms the third component 22 of the spoke 12. The first and second forms 14, 16 could be cycled together with one another, or could be separately cycled through the application stations 18, 20, 22, 24, 26, 28 as illustrated on the left hand side of FIG. 4. The third component 22 is placed onto the second form 16 by any machine or process capable of doing so at the nose extrusion application station 22. FIG. 6 shows a side view of the second form 16 in which the third component 22 is placed into the indented apex 40 at the top of the second form 16. The third component 22 may engage both the first surface 36 and the second surface 38 in some embodiments. In other arrangements, the third component 22 does not engage the surfaces 36, 38. The fixture circulates as indicated by reference numbers 14 and 16 in FIG. 4, but in some embodiments the fixtures may remain stationary while the application stations circulate to the fixtures 14, 16, or the application stations may remain stationary while robots or other processes move the components onto the fixtures 14, 16, or yet in other embodiments all or some combination of the application stations and the fixtures 14, 16 may move. Regardless, the process functions by having the components 18, 20, 22, 24, 26 and 28 placed at some point onto the fixtures 14, 16.

The first and second components 18, 20 have on the first form 14 only those components 24, 26, 28 located on one side 32, 34 and not on the opposite side, this opposite side being completely free from contact with any of the components of the spoke 12. In contrast, the second form 16 includes only a component 22 that is located on this opposite side, with the second form 16 holding no components of the spoke 12 other than those that engage on this opposite side. In this regard, the components on opposite sides of the first and second components 18, 20 that form the legs of the spoke 12 are located on different ones of the forms 14, 16.

Figure 7:
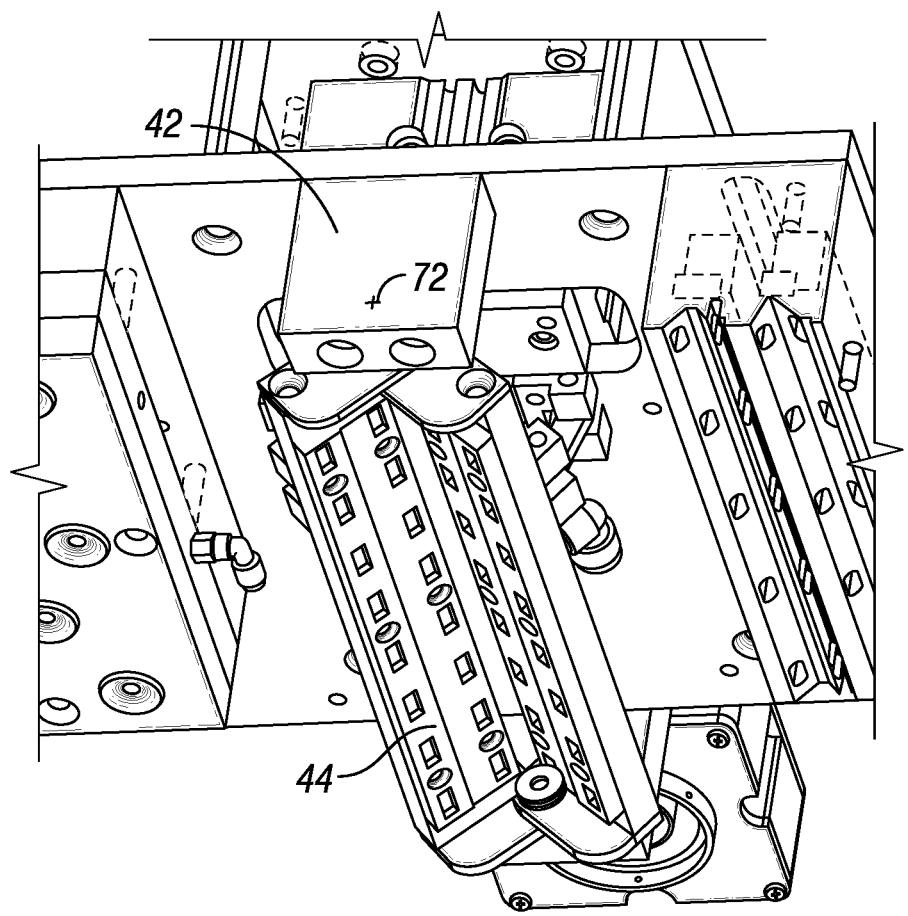
FIG. 7 is a perspective view of a pick and place device with an end effector.
Figure 8:
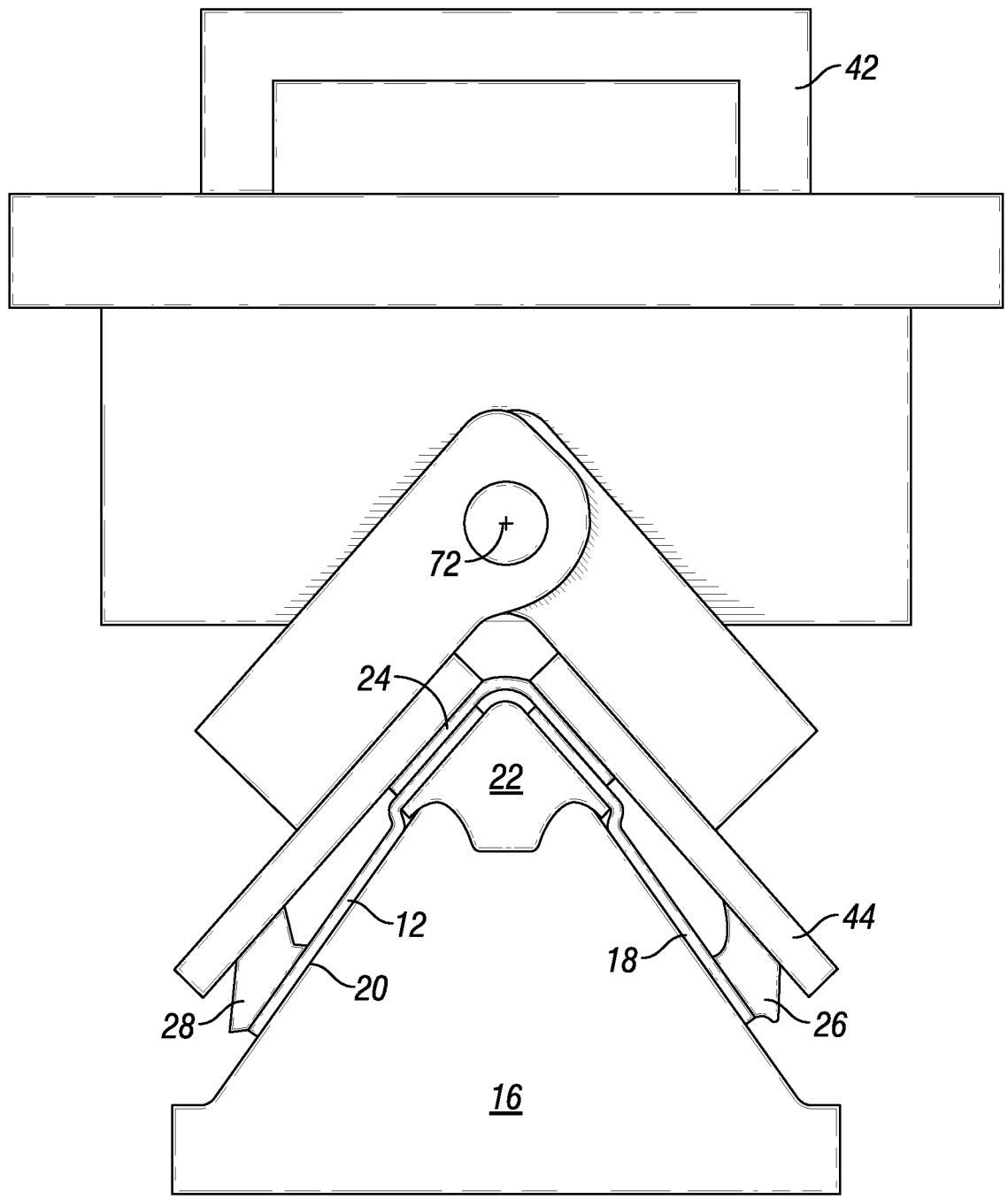
FIG. 8 is a side view of a pick and place device folding components of the spoke onto another component of the spoke located on the second form.

The components 18, 20, 22, 24, 26 and 28 are assembled into a green spoke 12 by moving the components 18, 20, 24, 26 and 28 from the first fixture 14 onto the third component 22 on the second form 16. FIG. 7 is a perspective view of a pick and place device 42 that is capable of automatic movement between the forms 14, 16 and is used to move the components 18, 20, 24, 26 and 28 from the first form 14. The pick and place device 42 has an end effector 44 that is a hinge actuated mechanism located at its end that accomplishes the task of picking up the components and folding them into proper position. The actuated hinge mechanism end effector 44 has a pair of plates that pivot relative to one another about pivot axis 72 so that the faces of the plates angle towards and away from one another. The faces of the plates are provided with ports that receive vacuum so that components can be drawn against the face of the plates, and could have air or positive pressure applied through to cause removal of components from the face of the plates. The plates of the end effector 44 can be angled away from one another to such an extent that both faces lie in the same plane as one another, and the pick and place device 42 can be moved to the first form 14 that has the components 18, 20, 24, 26, 28 thereon. The actuated hinge mechanism 44 may grasp and pick up the components 18, 20, 24, 26 and 28 from the first form 14. While this is happening, the third component 22 can already be on the second form 16, or may be being placed onto the second form 16. The pick and place device 42 may move the held components 18, 20, 24, 26 and 28 over to the second form 16 that includes the third component 22 thereon. The actuated hinge mechanism 44 pivots about axis 72 to cause the held components 18, 20, 24, 26 and 28 to likewise fold into the arrangement shown in FIG. 8. This folding may occur before the held components 18, 20, 24, 26, 28 come into contact with the second form 16 such that the components are folded and then moved relative to the second form 16 to put them into engagement with the third component 22 and the second form 16. Alternatively, the folding may occur by having the components 18, 20, 24, 26, 28 moved into contact with the third component 22 at which time the actuated hinge mechanism 44 actuates to pivot the plates about the pivot axis 72 to fold the components 18, 20, 24, 26, 28 over the third component 22 and the second from 16. As shown, the fifth and sixth components 26, 28 are compressed by being held by the actuated hinge mechanism 44. This compression can be because the actuated hinge mechanism 44 has flat plates, or could be caused by the pressing of the actuated hinge mechanism 44 against the second form 16 when placing the components 18, 20, 24, 26, 28 thereon, or could be caused by some combination. The compression of the fifth and sixth components 26, 28 may be slight in that they can spring back and assume their uncompressed shapes as shown for instance with reference to FIG. 9. In other arrangements, the fifth and sixth components 26 and 28 are not compressed or distorted upon their movement from the first form 14 onto the second form 16. Alternatively, the movement and folding by the actuated hinge mechanism 44 may cause some compression to the fifth and sixth components 26, 28 which is corrected when these components 26, 28 are subsequently molded so that they assume their desired shapes.

It is to be understood that several, for example four or more, of each of the forms 14, 16 can circulate on an indexing conveyor from station to station in the application areas of the components onto the forms 14, 16 as described with reference to FIG. 4. With this arrangement, four spokes 12 could be simultaneously produced by the process with each simultaneously at different stages of the build process so that they are at a different step in the sequence. The applications as illustrated by reference numbers 26, 28, 24, 22, 18 and 20 in FIG. 4 can all be run simultaneously while building four separate green spokes 12. The cycle time may be 3 seconds in some embodiments. Although the present disclosure describes a particular sequence of steps of building the green spoke 12, it is to be understood that other sequences are possible such that the components 18, 20, 22, 24, 26 and 28 are not placed in the same order onto the forms 14, 16.

Figure 9:
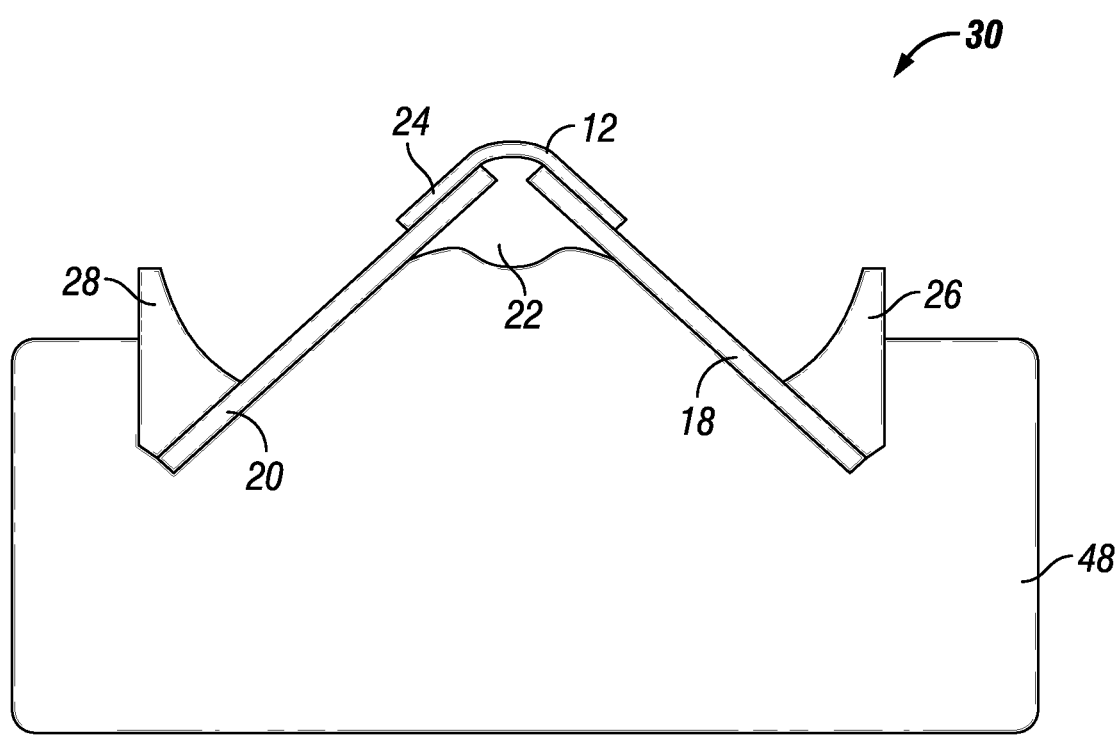
FIG. 9 is a side view of the green spoke on a second half of a mold.

After assembly of the green spoke 12 onto the second form 16, the green spoke 12 could be removed from the second form 16 and sent to a green spoke storage area as shown in FIG. 4. The green spoke storage area is between the green spoke build process on the left hand side of FIG. 4 and the curing process on the right hand side of FIG. 4. Up until this point, all of the components placed into the spoke 12 may be uncured. This storage area may provide a buffer for the potential stall of equipment used in the build process. The green spoke 12 could be stored on the second form 16 in the green spoke storage area, or may be removed therefrom and held by a separate device or could be directly placed into a mold 30 after lifting from the second form 16. Regardless, the green spoke 12 is moved from the second form 16 onto a second half 48 of a mold 30 as shown in FIG. 9. This transfer can be by a pick and place device, and the second half 48 can be a bottom half of the mold 30 onto which rests the green spoke 12. The loading of the green spoke 12 into the mold 30 is identified by reference number 48 as the "load green spoke into mold" station of the process in FIG. 4.

Figure 10:
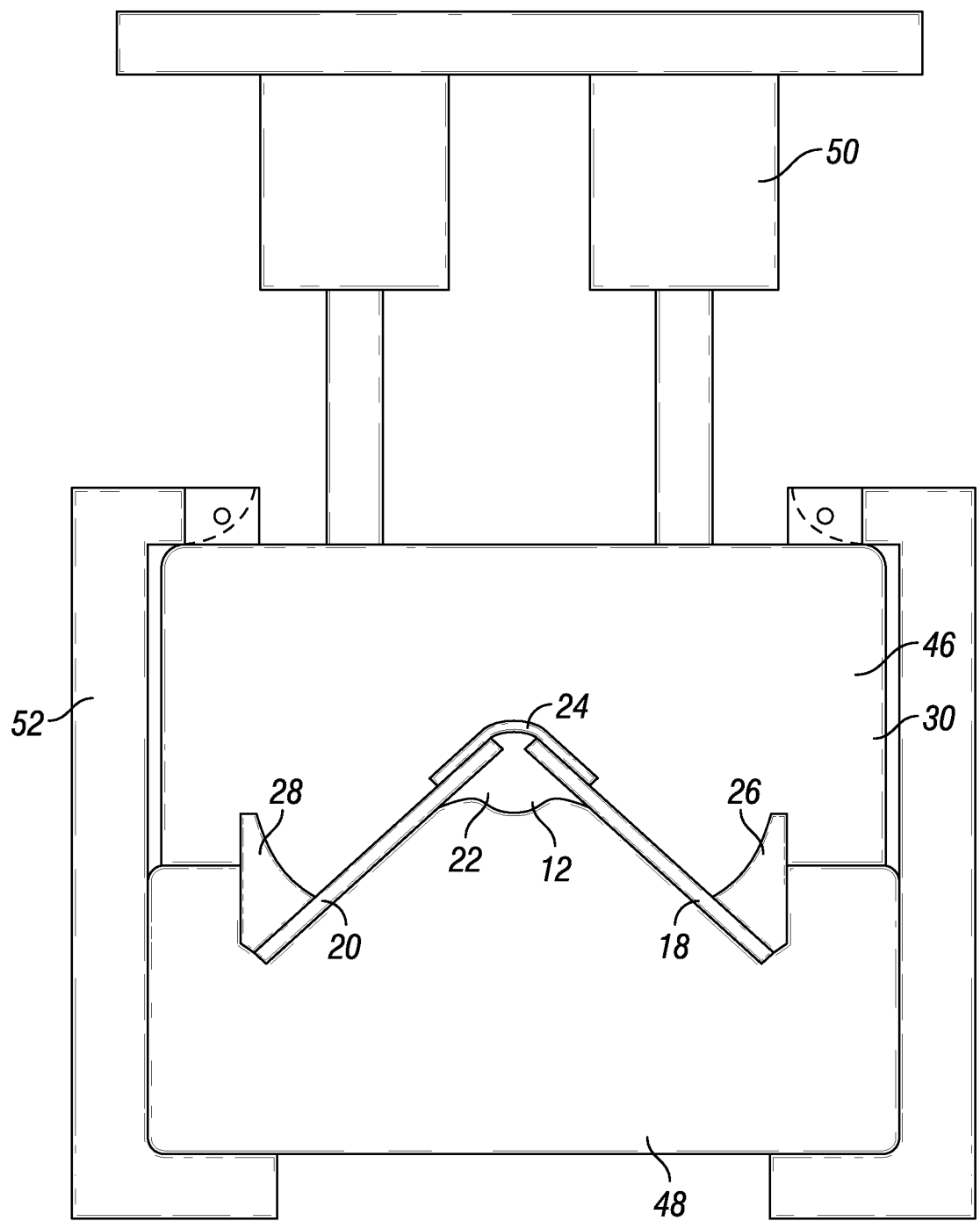
FIG. 10 is side view of a press compressing a green spoke in a mold with a lock locking the mold in the compressed arrangement.

The curing process may then move onto the next step shown in FIG. 4 as the press and lock mold step 50. FIG. 10 shows a press 50 that urges the top half 46 of the mold 30 onto the second half 48. The press 50 has one or more hydraulic cylinders that actuate to force the top, first half 46 down onto the bottom, second half 48 with the green spoke 12 between the first half 46 and the second half 48. This compression causes some squeezing and deformation of the green spoke 12 into the desired final form. After the squeezing by the press 50, or simultaneously therewith, a lock 52 can be applied to the mold 30 to lock it in the squeezed position. The cylinder force of the press 50 can be released and the mold 30 will remain in the squeezed position so that the green spoke 12 in the mold 30 still feels compressive forces even with the compression of the press 50 released. Any mechanism may be employed to lock the mold 30 in the squeezed position. FIG. 10 illustrates two arms on either side of the mold 30 that pivot from the first half 46 and engage the bottom of the second half 48. The arms can pivot as the first half 46 is pressed against the second half 48. Alternatively, the first and second halves 46, 48 could be first pressed against one another and then subsequently the lock 52 can engage to hold the halves 46, 48 against one another with the pressure applied. As stated, the lock 52 can be variously configured and need only be capable of holding the two halves 46, 48 together after they have been pressed together by the press 50.

Figure 11:
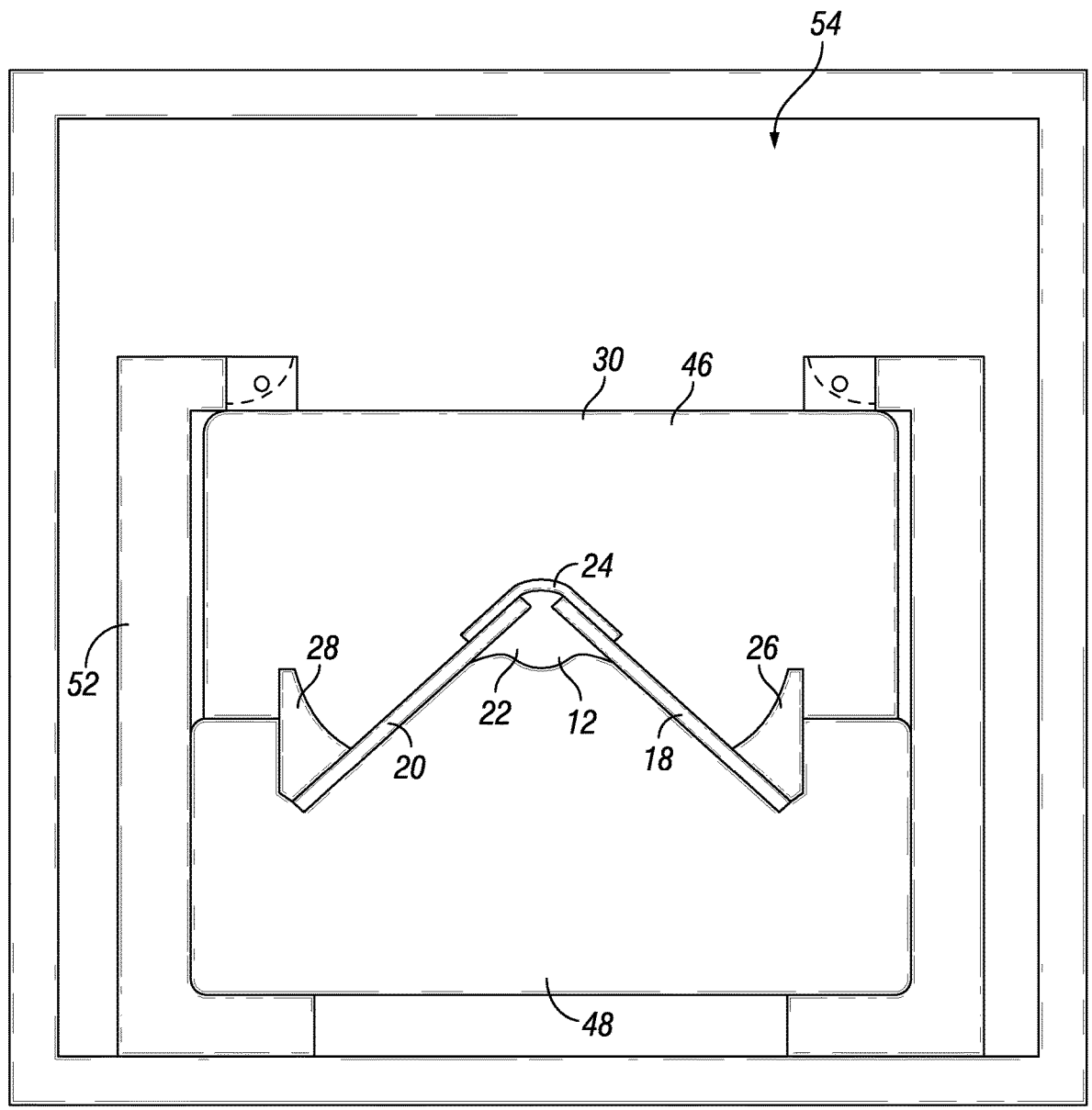
FIG. 11 is a side view of a locked mold with a spoke located within and heated in an oven area.

Once the mold 30 has been locked together by the lock 52, the locked mold 30 may be transferred to the heated mold management system/conveyor station designated by reference number 54 in FIG. 4. As shown in FIG. 11, the locked mold 30 is in an oven area 54 of an oven and is heated in the oven area 54. The heating may be by induction, conduction, convection, radiation, or any combination of methods. The oven area 54 may include steam, water, nitrogen or other fluid into which the locked mold 30 is immersed. The locked mold 30 may be heat soaked in the oven area 54. The press 50 that forces the mold 30 closed is not located within the oven area 54. Instead, the mold 30 is locked by the lock 52 once the pressure is applied, and the lock 52 maintains the pressure on the mold 30 while the mold 30 is within the oven area 54 so that the spoke 12 is cured in the oven area 54 by a combination of heat and pressure. The functionality of the mold 30 in being able to be locked by the lock 52 and heated in the oven area 54 allows the press 50 to be free so that it can press a subsequent mold 30/green spoke 12 assembly. Although described as including but a single green spoke 12, in some arrangements the mold halves 46, 48 can have multiple cavities so that the mold 30 can hold a plurality of green spokes 12 instead of just a single green spoke 12.

Once the spoke 12 has been cured for a sufficient length of time the locked mold 30 can be removed from station 54 as shown in FIG. 4 and moved to a demold press station 56 as also denoted in FIG. 4. The curing of the spoke 12 causes the various components 18, 20, 22, 24, 26 and 28 to be bonded to one another. In some instances, the mold 30 may remain in the oven area 54 for a period time from 5-8 minutes for the spoke 12 to cure. The cycle time of the curing process may be 3 seconds in some arrangements and in some implementations 150 molds 30 can be present to execute the curing process. At the demold press station 56, the lock 52 is removed and the first half 46 is lifted or otherwise moved away from the second half 48. The demold press station 56 then removes the cured spoke 12 from its cavity within the second half 48, and the cured spoke 12 is transferred to the spoke inspection and adhesion prep station designated by the reference number 12 in FIG. 4. The spoke 12 can then be incorporated into the non-pneumatic tire 10 by being attached to the hub 68 and the shear band 64.

Once the locked mold 30 is unlocked at the demold press station 56, the first half 46 can be circulated back to the press and lock mold station 50 as per the reference number designed 46 in FIG. 4. Upon demolding of the spoke 12, the lower second half 48 may be circulated back to the load green spoke into mold station 48 as indicated by the reference number 48 in FIG. 4. As may be appreciated, any number of mold halves 46, 48 can be incorporated into the curing process and there need not be the same number of first halves 46 and second halves 48 in circulation in the curing process. The curing process on the right hand side of FIG. 4 can be run simultaneously with the green spoke 12 building process on the left hand side of FIG. 4. The cycle time of the curing process can be 3 seconds.

The various stations denoted by the boxes in FIG. 4 can each include one or more of their own unique pick and place device or fixture to build the spokes 12 in parallel and achieve an automated process of manufacture with a low cycle time in a minimum number of steps. Any of the pick and place devices described can use vacuum and compressed air to aid in the grasping, transporting and removal of the component, green spoke 12, or cured spoke 12 therefrom. Another alternative to manufacturing the spoke 12 involves the elimination of the construction of the green spoke 12 with the forms 14, 16 and instead includes placing the components 18, 20, 22, 24, 26, 28 directly into the first half 46 and/or second half 48. However, using such a process would increase the number of molds 30 necessary and would also prevent the possibility of a buffer being present between the building of the green spoke 12 and the curing of the spoke 12. The forms 14, 16 and feed systems can be configured to handle multiple spokes 12 at each step of the process. For example, each station could have three spoke 12 positions and each station could apply materials for three spokes 12 during each cycle.

Although six components 18, 20, 22, 24, 26, 28 are discussed in the construction of the spoke 12, it is to be understood that more or fewer than six components can be incorporated into the spoke 12 in other exemplary embodiments. In some arrangements, only three components 18, 20 and 22 are present. When six components are used, it may be the case that only four of the six components are unique in composition and cross-sectional shape. For instance, the two foot components 26, 28 may be of the same composition and cross-sectional shape as one another, and the two legs 18 and 20 can likewise be of the same cross-sectional shape and composition as one another.

Figure 12:
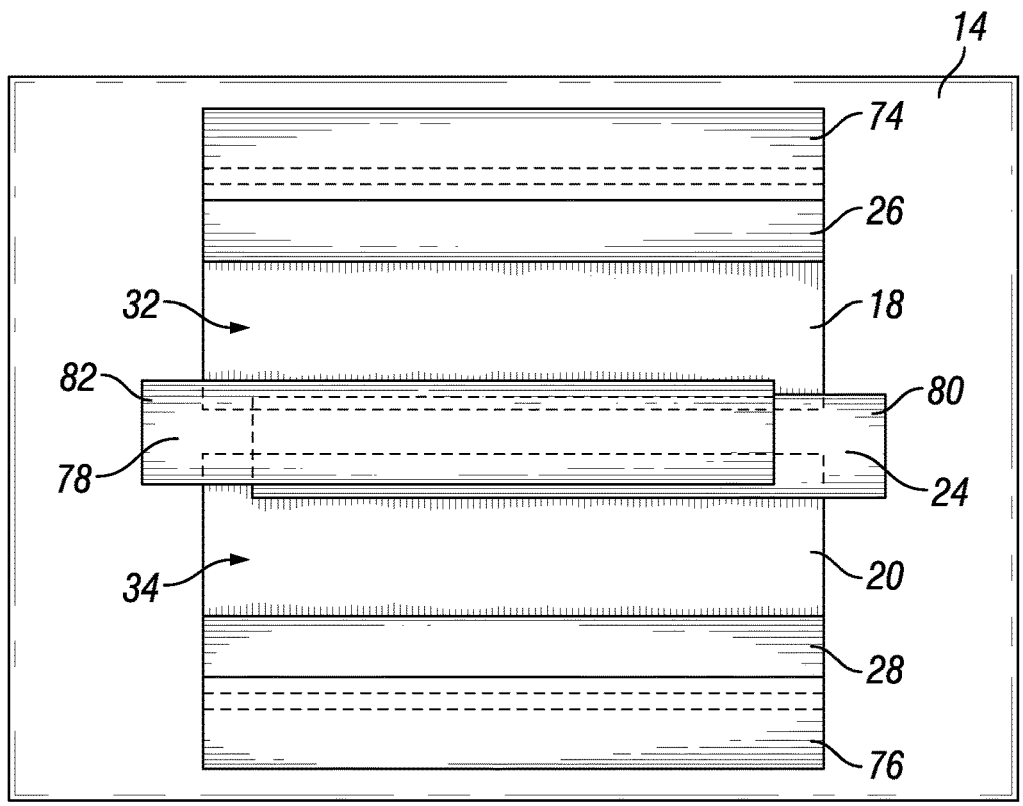
FIG. 12 is a top view of the first form with spoke components thereon in accordance with another exemplary embodiment.

As an additional example, another exemplary embodiment of the spoke 12 and associated components is illustrated with reference to FIGS. 12 and 13. In FIG. 12, the first form is provided with eight components. The first component 18 and second component 20 are again panels of the spoke 12 and are placed next to one another but not in contact with one another on the upper surface of the first form 14. The fifth component 26 which can be an inner foot is placed on the upper surface 32 of the first component 18, and the sixth component 28 which can be an outer foot is placed on the upper surface 34 of the second component 20. A seventh component 74 is included and may be a rubber tissue and can be positioned on top of the fifth component 26 and free from engagement with the upper surface 32. The seventh component 74 may extend off of the fifth component 26. An eighth component 76 is also present and can be a rubber tissue positioned on top of the sixth component 28 and free from engagement with the upper surface 34. The eighth component 76 may extend off of the sixth component 28.

The fourth component 24 may again be present and may be used at the nose section of the resulting spoke 12. The fourth component 24 is placed so as to engage both upper surfaces 32 and 34 and is offset from the left edges of the first and second component 18, 20. The fourth component 24 has an overlap 80 that extends off of the right side edges of the first and second components 18, 20. The fourth component 24 engages a larger amount of the upper surface 34 than the upper surface 32. An additional ninth component 78, which can be made of rubber tissue and which may be the same material as the fourth component 24, is present and is provided as a strip the same size as the fourth component 24. The ninth component 78 engages and overlays the fourth component 24 and is offset from the fourth component 24 so that it is over more of the upper surface 32 than the upper surface 34. The ninth component 78 has an overlap 82 that extends off of the left side edges of the first and second components 18, 20. The ninth component 78 is offset inboard from the right side edges of the first and second components 18, 20. Depending upon the flexibility of the ninth component 78, it may or may not engage the upper surfaces 32, 34 at various points. The components 18, 20, 24, 26, 28, 74, 76, 78 can be placed onto the upper surface of the flat first form 14 and the tackiness of the components can keep them together to some degree.

The components 18, 20, 24, 26, 28, 74, 76, 78 can be placed onto the first from 14 through the use of the previously described stations and through the use of other stations for the components 74, 76, 78 if necessary. This embodiment also requires a few other steps from that disclosed in other arrangements. In particular, the overlaps 80 and 82 are folded over so that they are under the first and second components 18, 20 and thus on the opposite sides from that of the upper surfaces 32, 34. This folding may be simultaneously done, or either one of the overlaps 80, 82 could be folded before the other. This folding can be achieved in a variety of manners. In some instances, the components 18, 20, 24, 26, 28, 74, 76, 78 are lifted off of the form 14 and a device folds the overlaps 80, 82 under the components 18, 20. The device may feature a pair of projections that engages the overlaps 80, 82 while the components 18, 20, 24, 26, 28, 74, 76, 78 are held by the end effector 44 of the pick and place device 42. The overlaps 80, 82 can be folded under while the components are in a flat orientation as shown in FIG. 12. In other arrangements, rollers engage the overlaps 80, 82 when the components are held in order to fold the overlaps 80, 82. In yet other arrangements, the overlaps 80, 82 may be folded under the first and second components 18, 20 manually by hand.

Figure 13:
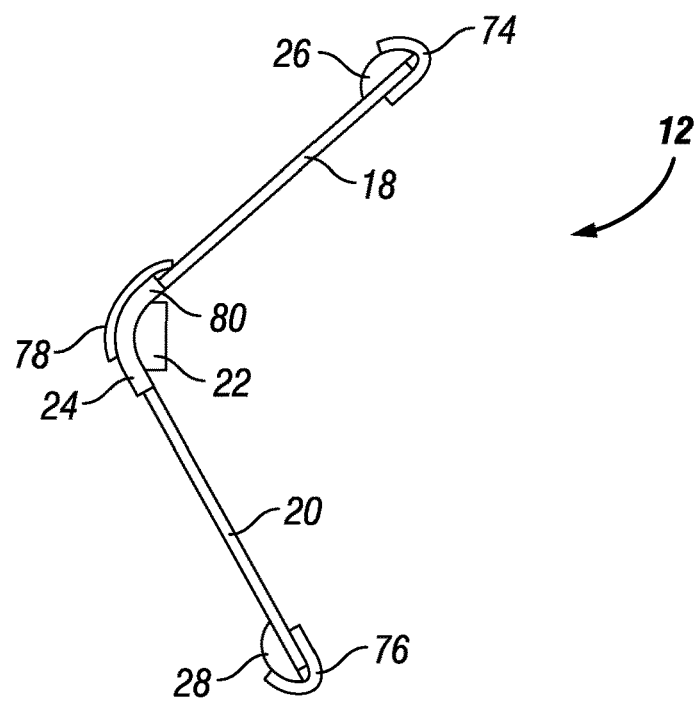
FIG. 13 is a side view of the spoke utilizing the spoke components of FIG. 12.

The process in the FIGS. 12 and 13 embodiment may also utilize a second form 16 that has the third component 20 located in an indented apex 40 as in previously discussed embodiments. With the overlaps 80, 82 folded into position, the components 18, 20, 24, 26, 28, 74, 76, 78 are moved into position for engagement with the third component 20. However, additional folding of the seventh component 74 and eighty component 76 is conducted before engagement with the third component 20. Here, a pair of rollers are present through which the end effector 44 moves. The seventh and eight components 74, 76 engage the pair of rollers upon the components 20, 24, 26, 28, 74, 76, 78 moving past so that the rollers roll the seventh component 74 around the fifth component and edge of the first component 18 and against the undersurface of the first component 18. At the same time, the rollers roll the eighth component 76 around the sixth component 28 and edge of the second component 20 and against the undersurface of the second component 20. Other mechanisms of folding the seventh and eighth components 74, 76 are also possible and rollers not need be used in all embodiments. With the components 24, 78, 74, 76 first folded, the components 20, 24, 26, 28, 74, 76, 78 are folded by the end effector 44 and pressed onto the third component 22 as it rests on the second form 16. The formed green spoke 12 is then moved into the green spoke storage stage as previously discussed, or is located into the mold at station 48 as previously discussed and a repeat of this information is not necessary. The green spoke 12 may then be cured in the mold 30 in an over area 54 to produce a cured spoke 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A method of manufacturing a spoke for a non-pneumatic tire, comprising:
   providing a first form;
   placing a first component of the spoke and a second component of the spoke on the first form;
   providing a second form;
   placing a third component of the spoke on the second form;
   transferring the first component and the second component to the second form;
   transferring the first component, the second component, and the third component from the second form to a mold; and
   applying heat and pressure to cure the first component, the second component, and the third component.

2. The method of claim 1, wherein the first component is a panel that is an inner leg of the spoke, wherein the second component is a panel that is an outer leg of the spoke, and wherein the third component is an extrusion that is a nose of the spoke, wherein the third component engages both the first component and the second component when the first and second components are transferred to the second form, and wherein the first component is free from engagement with the second component when the first and second components are transferred to the second form.

3. The method of claim 1, wherein placing the first component and the second component on the first form comprises placing a fourth component of the spoke, a fifth component of the spoke, and a sixth component of the spoke on the first form;
- wherein transferring the first component and the second component to the second form comprising transferring the fourth component, the fifth component, and the sixth component to the second form;
- wherein transferring the first component, the second component, and the third component from the second form to the mold comprises transferring the fourth component, the fifth component, and the sixth component from the second form to the mold; and
- wherein the applying comprises applying heat and pressure to cure the fourth component, the fifth component, and the sixth component.

4. The method of claim 3, wherein the first component has an upper surface and wherein the second component has an upper surface, wherein the fourth component engages both upper surfaces of the first and second components when the fourth component is placed on the first form, wherein the fifth component engages the upper surface of the first component when the fifth component is placed on the first form, and wherein the sixth component engages the upper surface of the second component when the sixth component is placed on the first form.

5. The method of claim 3, wherein the fourth component is made of polyester reinforced rubber tissue and is an apex portion opposite the third component and engages both the first and second components, wherein the fifth component is an extrusion that is an inner foot of the spoke and engages the first component, and wherein the sixth component is an extrusion that is an outer foot of the spoke and engages the second component.

6. The method of claim 1, wherein the first form is a flat fixture plate, wherein the second form is an angled form that has a first surface and a second surface arranged at a non-zero angle to one another, wherein the second form has an indented apex located between the first surface and the second surface, wherein the third component is placed into the indented apex, wherein the first component is placed on the first surface, and wherein the second component is placed on the second surface.

7. The method of claim 1, wherein transferring the first component and the second component to the second form comprising a pick and place device having an end effector that is an actuated hinge mechanism that grasps the first and second components from the first form and lifts the first and second components from the first form, wherein the pick and place device moves the first and second components to the second form and folds the first and second components over the third component located on the second form, wherein the actuated hinge mechanism end effector releases the first and second components on the second form.

8. The method of claim 7, wherein the end effector itself pivots to fold the first and second components.

9. The method of claim 1, wherein the first component and the second component are simultaneously lifted from the first form and simultaneously placed onto the second form during execution of the transferring of the first component and the second component to the second form.

10. The method of claim 1, wherein the first component, the second component, and the third component are simultaneously transferred from the second form to the mold during execution of the transferring of the first component, the second component, and the third component to the mold.

11. The method of claim 1, wherein the mold has a second half onto which the first component, the second component, and the third component are transferred from the second form, wherein the mold has a first half, wherein the first half and the second half are pressed together after the second half receives the first component, the second component, and the third component, wherein the first half and the second half are locked together after being pressed together.

12. The method of claim 11, wherein the locked mold is located in an oven area and a press does not push the first half and the second half together when the mold is heated in the oven area during the applying heat and pressure to cure the first component, the second component, and the third component.

13. The method of claim 1, wherein the mold has a first half and a second half, wherein after the applying heat and pressure to cure the first component, the second component, and the third component are located on the second half and the first half is moved to a subsequent mold with a subsequent second half and without a subsequent first half and utilized therewith, wherein as the first half is moved to the subsequent mold the second half is demolded at a demold press station.

14. The method of claim 3, wherein placing the first component and the second component on the first form comprising placing a seventh component of the spoke, an eighth component of the spoke, and a ninth component of the spoke on the first form;
- wherein transferring the first component and the second component to the second form comprising transferring the seventh component, the eighth component, and the ninth component to the second form;
- wherein transferring the first component, the second component, and the third component from the second form to the mold comprising transferring the seventh component, eighth component, and the ninth component from the second form to the mold; and
- wherein the applying comprising applying heat and pressure to cure the seventh component, the eighth component, and the ninth component.

15. The method of claim 14, wherein the fourth component has an overlap and wherein the ninth component engages the fourth component and has an overlap when the ninth component is placed on the first form, wherein the seventh component engages the fifth component when the seventh component is placed on the first form, wherein the eighth component engages the sixth component when the eighth component is placed on the first form;
- further comprising:
- folding the overlap of the fourth component and the ninth component before engagement of the third component with the first component and the second component, wherein the folding of the overlap of the fourth component causes the fourth component to be folded around and edge of the first component, and wherein the folding of the overlap of the ninth component causes the ninth component to be folded around an opposite edge of the first component;
- folding the seventh component around the fifth component and to a surface of the first component that is opposite from an upper surface of the first component, wherein the folding of the seventh component takes place before transferring the seventh component to the second form; and folding the eighth component around the sixth component and to a surface of the second component that is opposite from an upper surface of the second component, wherein the folding of the eighth component takes place before transferring the eighth component to the second form.

\* \* \* \* \*